(12) United States Patent
    Sifuentes Sanchez

(10) Patent No.: US 10,227,745 B2
(45) Date of Patent: Mar. 12, 2019

(54) METHOD FOR REPAIRING AN INTAKE FOR A STORAGE DAM

(71) Applicant: Humberto Leonides Sifuentes Sanchez, Saltillo (MX)

(72) Inventor: Humberto Leonides Sifuentes Sanchez, Saltillo (MX)

( * ) Notice: Subject to any disclaimer, the term of this patent is extended or adjusted under 35 U.S.C. 154(b) by 0 days.

(21) Appl. No.: 15/739,664

(22) PCT Filed: Aug. 24, 2016

(86) PCT No.: PCT/MX2016/000086
    § 371 (c)(1),
    (2) Date: Dec. 22, 2017

(87) PCT Pub. No.: WO2016/209067
    PCT Pub. Date: Dec. 29, 2016

(65) Prior Publication Data
    US 2018/0298576 A1    Oct. 18, 2018

(30) Foreign Application Priority Data
    Jun. 25, 2015    (MX) .......................... A/2015/008372

(51) Int. Cl.
    *E02B 9/04*    (2006.01)
    *E02B 8/02*    (2006.01)

(52) U.S. Cl.
    CPC . *E02B 9/04* (2013.01); *E02B 8/02* (2013.01)

(58) Field of Classification Search
    CPC ..... E02B 3/10; E02B 5/08; E02B 8/02; E02B 9/04; E02D 23/08
    USPC ..................................................... 405/14, 127
    See application file for complete search history.

(56) References Cited

U.S. PATENT DOCUMENTS

| | | | | |
|---|---|---|---|---|
| 3,686,877 A | * | 8/1972 | Bodin ....................... | E02D 7/18 173/49 |
| 3,927,534 A | * | 12/1975 | Larson ..................... | E02B 1/006 137/363 |
| 5,567,076 A | * | 10/1996 | Leong ..................... | E02D 19/04 405/11 |

(Continued)

FOREIGN PATENT DOCUMENTS

| | | |
|---|---|---|
| CA | 2987003 A1 * | 12/2016 |
| JP | 2004068406 A * | 3/2004 |

(Continued)

*Primary Examiner* — Frederick L Lagman
(74) *Attorney, Agent, or Firm* — James P. Muraff; Neal, Gerber & Eisenberg LLP

(57) ABSTRACT

The present invention relates to a method for repairing an intake for a storage dam, which comprises; constructing a cabin for controlling sediment, formed by modular rings that are 12 m in diameter and 3 m high, to allow the demolition of the old intake without draining the area; prefabricating elements for extending the new intake in situ by means of metallic formwork for setting the modular elements which are subsequently steam-cured and transferred to a final location by means of a barge and cranes. The final assembly is carried out using divers and cabin equipment, such as lighting, closed-circuit cameras, monitoring, emergency stairs and an elevator or service elevator, ensuring a reduction in the time and cost of repairing an intake in storage dams.

16 Claims, 11 Drawing Sheets

(56) References Cited

U.S. PATENT DOCUMENTS

| | | | | |
|---|---|---|---|---|
| 6,142,705 A | * | 11/2000 | Edwards | E02B 8/04 |
| | | | | 137/143 |
| 2003/0089658 A1 | * | 5/2003 | Dreyer | B01D 29/15 |
| | | | | 210/416.1 |
| 2013/0048551 A1 | * | 2/2013 | Maxson | B01D 35/02 |
| | | | | 210/323.2 |

FOREIGN PATENT DOCUMENTS

| | | | |
|---|---|---|---|
| KR | 100743639 | * | 7/2007 |
| KR | 101224968 | * | 1/2013 |
| KR | 101378879 | * | 3/2014 |
| WO | WO 2013024992 | * | 2/2013 |
| WO | WO-2016209067 A2 | * | 12/2016 |

* cited by examiner

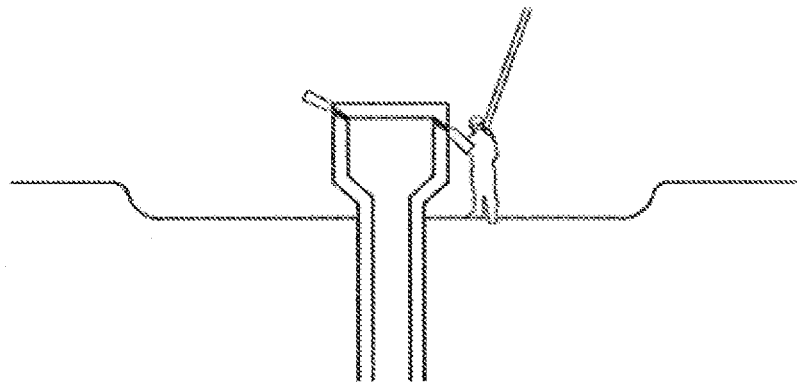
Figure 12
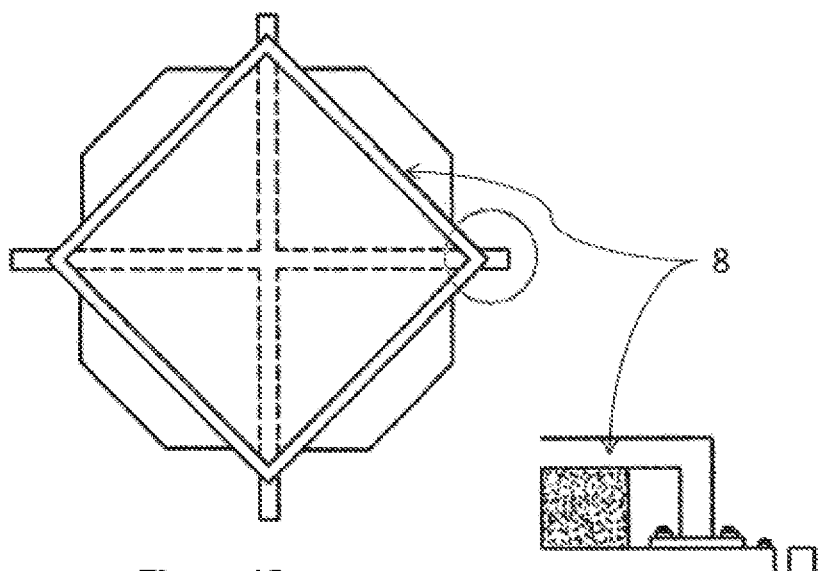
Figure 13
Figure 14

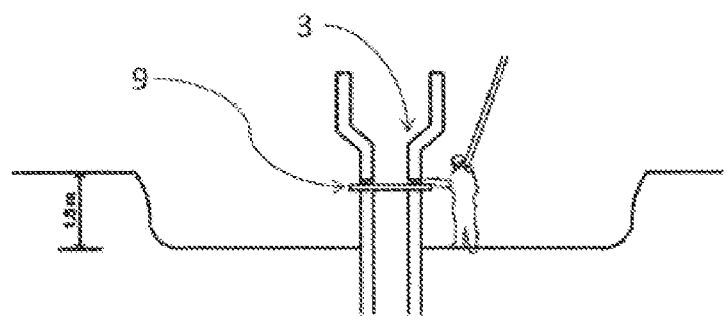
Figure 15
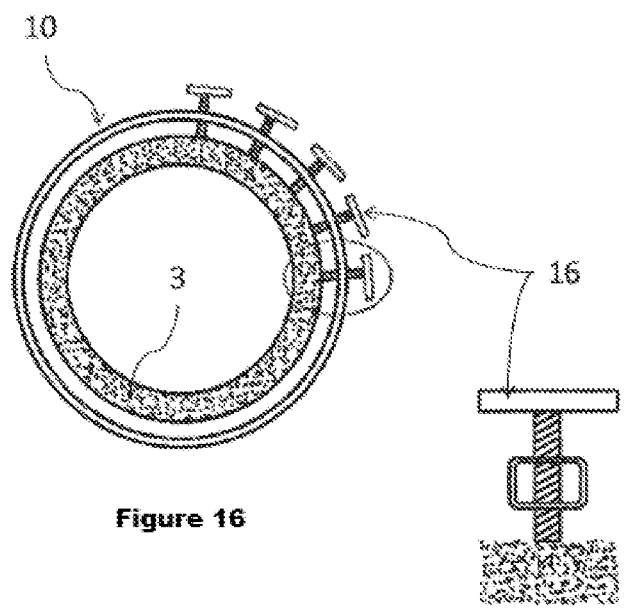
Figure 16
Figure 17

METHOD FOR REPAIRING AN INTAKE FOR A STORAGE DAM

OBJECT OF THE INVENTION

The aim of the present invention is to provide an efficient method which substantially reduces the tasks for repairing an intake, said method using tools and apparatuses to efficiently increase the height of the intake, reducing costs and operating times.

BACKGROUNDS

For a water storage dam, the intake is the contact between said water storage dam and the irrigation zone, hence the importance of the intake; If it were to be obstructed, the dam and the irrigation zone thereof would be unusable, because it is an area that is typically submerged, making it difficult to repair. The rains cause river and stream runoff, that besides the water, drag solids such as gravel and erosion-produced sand, the path of said materials ending up at the vessel of the storage dam, where it begins decantation and sedimentation as the water stagnates; in this process, the solids in suspension are deposited at the bottom of the dam and, throughout the years, it produces considerable volumes of what is known as sedimentary deposit. This, however, is an expected outcome in all projects; a use life of 50 or 60 years is also generally estimated. This circumstance is a major problem which has different solutions, all at considerable cost, same which are outlined below:

Option 1

Build a new dam

Notes

Too costly, generally not feasible, in addition to having been built 50 or 60 years ago; Therefore, it occupies the best topographic and geological site in the vicinity of the region to be benefited. Furthermore, it should be noted that the infrastructure of the irrigation zone, often thousands of hectares, would become useless.

Option 2

Build a new intake, including the floodways, up to the irrigation zone.

Notes

Likewise very costly and not advisable, the topographic characteristics of each case must be considered, frequently the floodway is designed by drilling tunnels through the hillside.

Option 3

Repair the intake.

Notes

This is the most feasible option, however, it is also very costly, since the cofferdam system (large tubes driven into the sedimentary deposit) is used to form a structure that withstands the thrust force of the water, when draining the internal area of the structure thus formed, generally double-squared dimensions according to the particular needs of the project, filling up the area between the double square to provide stability. Work cannot begin until the internal area of the structure is drained first.

The present invention uses an entirely different method than the methods already known, since it does not use cofferdams, the present invention when using a modular cabin to isolate the work area, and when employing divers to perform the works inside the dam with the decantation systems, make for the intake repair work to be shorter time and more efficiently than the aforementioned options.

BRIEF DESCRIPTION OF THE DRAWINGS

FIG. 12 is a schematic view showing the use of divers and pneumatic equipment to begin the demolition of the intake cover, taking special precautions when cutting such that the cover may be removed in one piece.

FIG. 13 is a plan view of the demolished cover showing the SAFETY FRAME encasing the cover with two 6" gauge 40 PTR metal structures, both frames are attached by screws and 4 hook holders used to initiate lifting and removal of the cover by the crane.

FIG. 14 is a detailed side view of the attachment method of the two structures comprising the SAFETY FRAME.

FIG. 15 is a schematic view showing the use of divers and pneumatic equipment for the demolition of the rest of the intake, which shows the use of the GUIDE FRAME to make the horizontal cut.

FIG. 16 is a plan view of the CALLIPER FRAME for obtaining the exact measurements of the outer perimeter of the remaining body of the old INTAKE.

FIG. 17 is a detailed view of the crank used to obtain the exact shape and measurement of the outer perimeter of the intake.

DETAILED DESCRIPTION OF THE INVENTION

Figure 1:
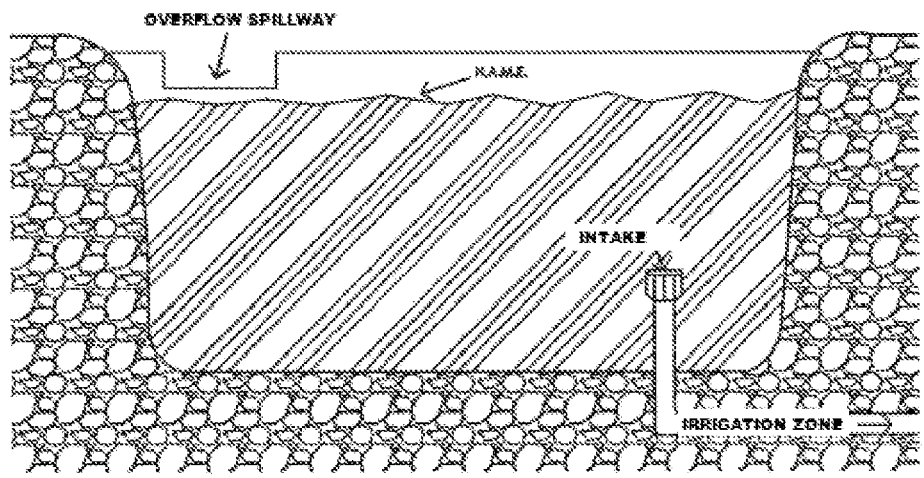
FIG. 1 shows a cross-sectional view of a new or recently built storage dam, which shows the intake and, additionally, it shows in a simple manner the principal characteristics thereof, a port or a mouthpiece wherein the topography or adjacent hillside allows for the construction of a dam.

A storage dam (FIG. 1) is a civil work built to store large volumes of water, generally for irrigation, and others for electric power generation, taking advantage of the topographic location to make more affordable the construction of a storage dam with different components, such as an overflow spillway (serving to handle the excess of collection) and the INTAKE (3) as its name indicates is a construction that by means of large valves (one cubic meter per second or more) obtains water to be channeled to the irrigation zone, which is built to continue working after 50 or 60 years of operation, preventing blockage by the accumulation of sedimentary deposit produced by constant runoff. When the runoff enters the vessel and deposit sediments close to the INTAKE threshold (3), as shown in (FIG. 2), it puts the operation of the storage dam at risk.

Currently, intakes are repaired by the construction of cofferdams (large-scale pipes and sheets anchored into the sedimentary deposit) that withstand the strength of containing water in the exterior and subsequently, to demolish and construct a new intake; by increasing the height of same, the use life of the dam can be extended to 50 or 60 years, depending on the particular characteristics of the site. Nevertheless, this process is quite costly.

REPAIRING AN INTAKE FOR A STORAGE DAM, as described in the present invention, is performed using a CABIN FOR CONTROLLING SEDIMENT (1), whose main characteristic is to enable the performance of said works without draining the interior thereof. The present invention consists in the use of the CABIN (1) and various complementary tools aimed at simplifying the process.

The main advantage of the present invention for REPAIRING AN INTAKE FOR A STORAGE DAM is that draining the work area is not required, rather, such drainage is done by constructing a CABIN FOR CONTROLLING SEDIMENT (1), which consists of a modular system of circular structures (3.00 m high, each), stacked until surpassing the water depth of the reservoir, all modular rings or circles (usually 12.0 m in diameter) are assembled on the outside and, by means of a barge and cranes (2), are lifted and deposited over the area where the INTAKE (3) is located; these cabins (1) will have lighting poles (6), closed-circuit mobile video cameras (21), 4 emergency seascape stairs (17), elevator or forklift (22). Once assembly of the CABIN FOR CONTROLLING SEDIMENT (1) is completed, the water on the inside is isolated from the rest of the reservoir and therefore ceases to form part of the streams thereof, accelerating the sedimentation, decreasing the turbidity of this type of reservoirs; complementary to this, two pipes are placed, one at the bottom for pump-extraction of the sediments and another one at the top for filling the make-up water, because, due to the characteristics of the cabin, the same amount of water should always be added to that which is extracted, hence, due to the above, special care should be taken to ensure that this operation is simultaneous and the volumes are equal to prevent the cabin from collapsing. To increase water clarity, water shall be applied to the 1% clarifier by means of a semicircular mini-sprinkling irrigation system (4) without exceeding the ratio of 1 liter of concentrate per every 100 cubic meters of water inside the cabin.

The CABIN (1) has, in the top part, a perimeter aisle (4) equipped with lighting (6), the lighting posts (6) having a folding system that can bend whenever the crane operations require it. The lower part of the CABIN (1) has a preferably 3.00-m or grater brace (7), depending on the needs of each project, this brace (7) is used to place the jumbo sacks filled with gravel for counterweight onto it, the number of sacks being calculated based on the particular characteristics such as: water depth, reservoir dimensions, work site, etc., THE CABIN FOR CONTROLLING SEDIMENT (1) is one of the main tools designed for REPAIRING THE INTAKE FOR A STORAGE DAM, since it enables the old construction to be demolished and the new INTAKE to be assembled, without draining the work area.

Figure 4:
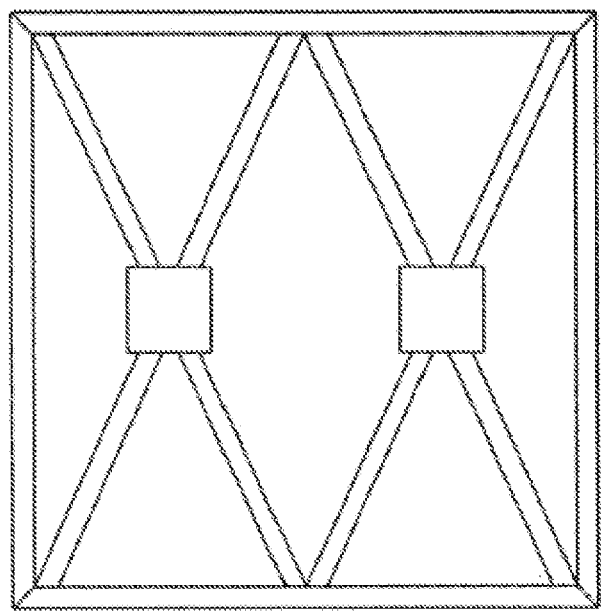
FIG. 4 is a front view of the PTR structure used to assemble the modular ring for constructing the CABIN.
Figure 5:
FIG. 5 is a side view of the PTR structure used to assemble the modular ring for constructing the CABIN, said side view shows the tarp covering the perimeter of said CABIN.
Figure 6:
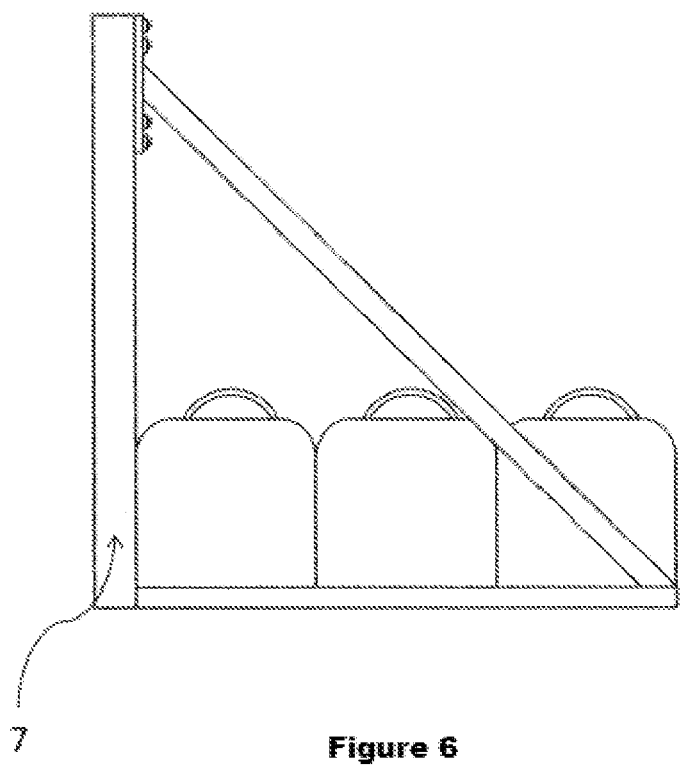
FIG. 6 is a side view of the COUNTERWEIGHT LOAD CIRCULAR PLATFORM, depicting the sacks that will keep the CABIN submerged.

Each 12-m diameter and 3-m high modular ring which conform the cabin (1) is comprised by twelve 3.0 m columns, made of 8" gauge 40 PTR with a 0.40×0.40 m plate that is ½" thick at each end, with eight 1"-diameter and 3"-length screws and twelve 2.94×3.00 m-curved frames made of 6" gauge 40 PTR (rolled at their horizontal sides) (FIG. 4), which have 1" diameter by 8" length screws at 40 cm intervals in the horizontal section and 24" screws in the vertical sections; two X-shaped reinforcements and two 0.40×0.40 ¼" plates. Each of these frames has a 2" rubber perimeter gasket (FIG. 5) so that when the canvas is tensioned, it yields the maximum airtightness and prevents the outer turbid water from mixing with the cleaner water inside the cabin, and these frames are rolled in such a way as to form a 12.0.-m diameter circle.

Upper and lower template molds expressly made for ensuring the exact assembly when placing them in the corresponding superimposed position in the CABIN shall be used for the assembly of each module. The top template mold is removed from the module being assembled and a ½" thick and 0.50 m width plate-based template is affixed thereto so that the module is not warped when lifting it to transfer it to the INTAKE.

A COUNTERWEIGHT LOAD CIRCULAR BRACE (7) will be placed on the outer perimeter floor of the CABIN FOR CONTROLLING SEDIMENT (1); it consists of a grid made from 6" gauge 40 PTR (spaced at 40 cm intervals), this brace is also manufactured according to the requirements of the project, its base may be 3.0 m wide or greater. Its main function is to receive the jumbo gravel-filled sacks that shall provide it with the stability required by the CABIN (1). The number of sacks is calculated based on the particular characteristics of each work.

Figure 7:
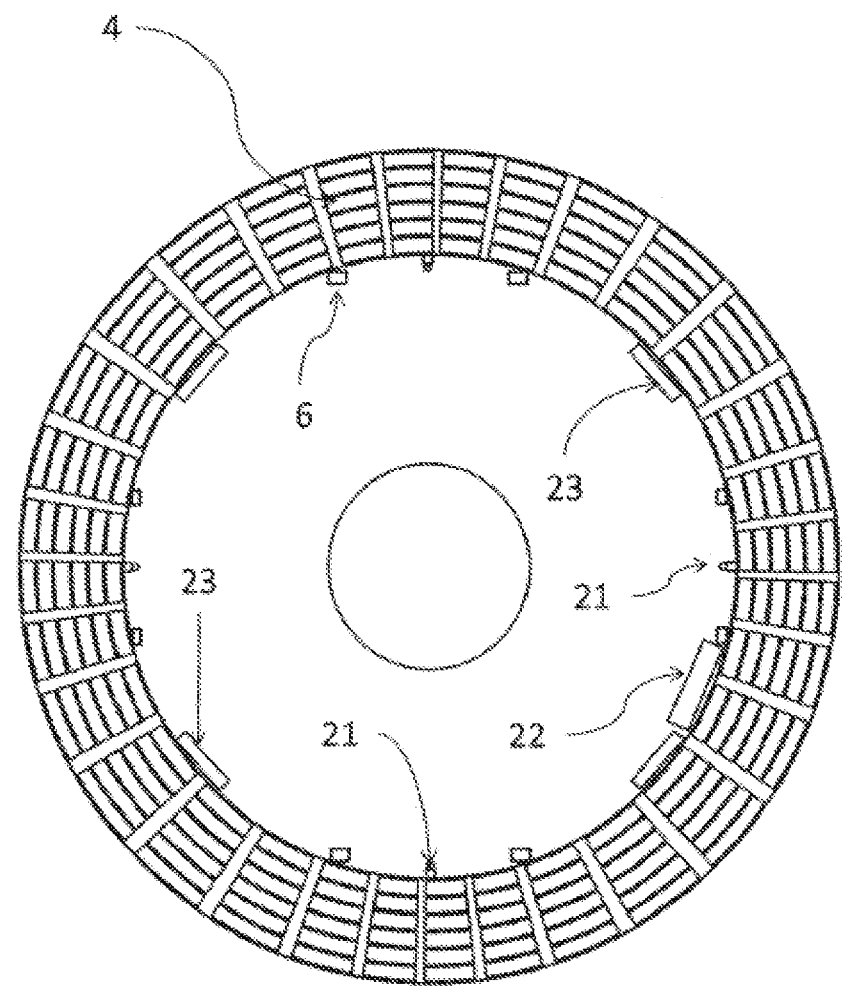
FIG. 7 is a plan view of the CABIN FOR CONTROLLING SEDIMENT wherein the interior perimeter shows the lamps, closed-circuit cameras, seascape stairs, and emergency elevator.
Figure 8:
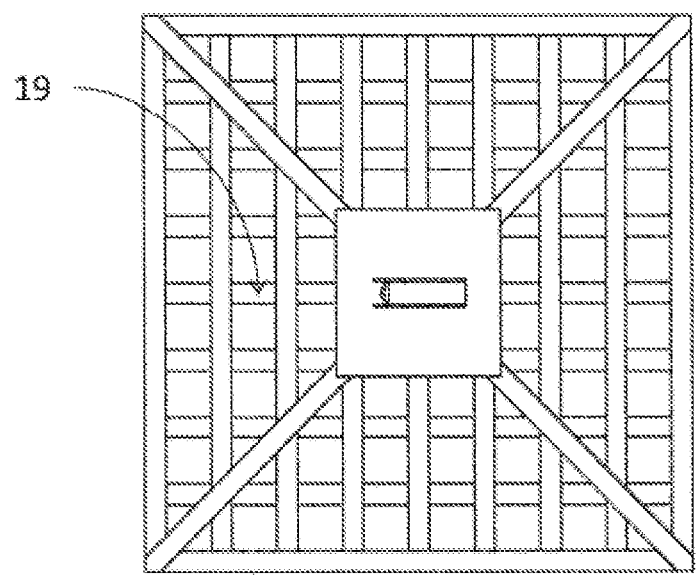
FIG. 8 is a plan view of the 4.00×4.00 m TENSOR COUNTERWEIGHT LOAD PLATFORM, consisting of 6"×6" PTR, a platform will be placed for each steel cable or tension belt.
Figure 9:
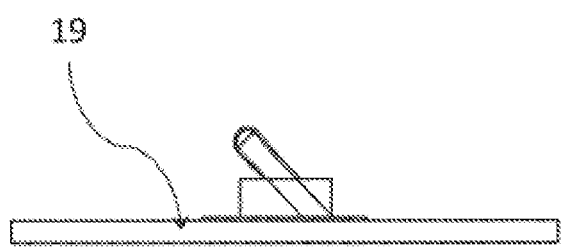
FIG. 9 is a side view of the TENSOR COUNTERWEIGHT LOAD PLATFORM, which shows the terminal to which the tensor is fastened.
Figure 10:
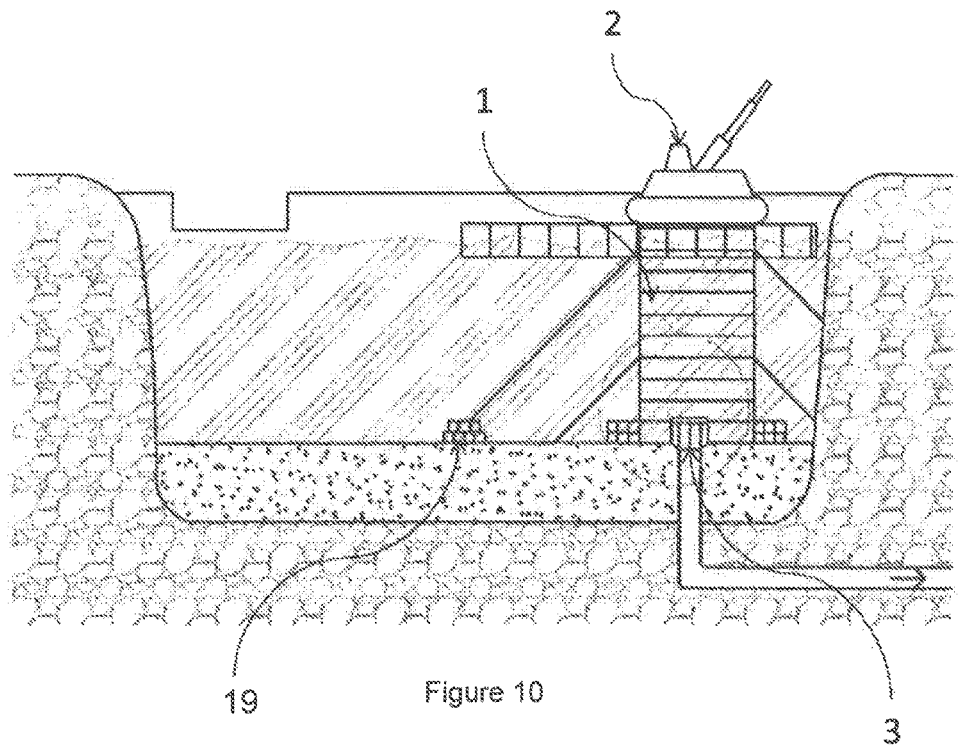
FIG. 10 is a view of the installed equipment to be used, such as: barge, crane, CABIN FOR CONTROLLING SEDIMENT, COUNTERWEIGHT LOAD PLATFORMS, to begin the STORAGE DAM INTAKE REPAIR works.
Figure 11:
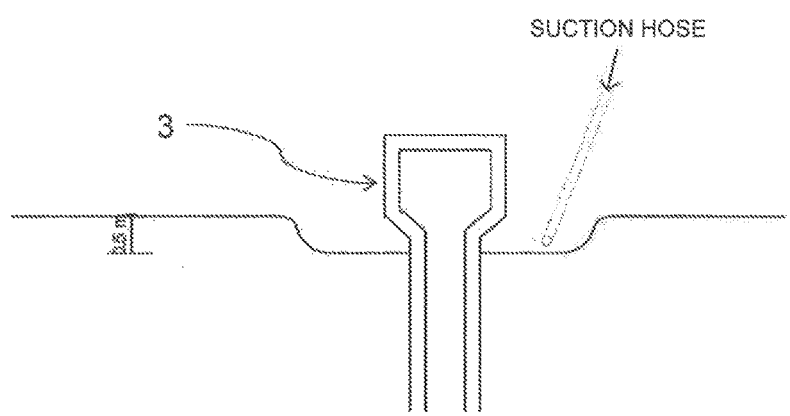
FIG. 11 is a detailed view showing the preparation of the perimeter access to facilitate the demolition works in the INTAKE to be repaired, showing the sedimentary deposit removal with suction hose.
Figure 18:
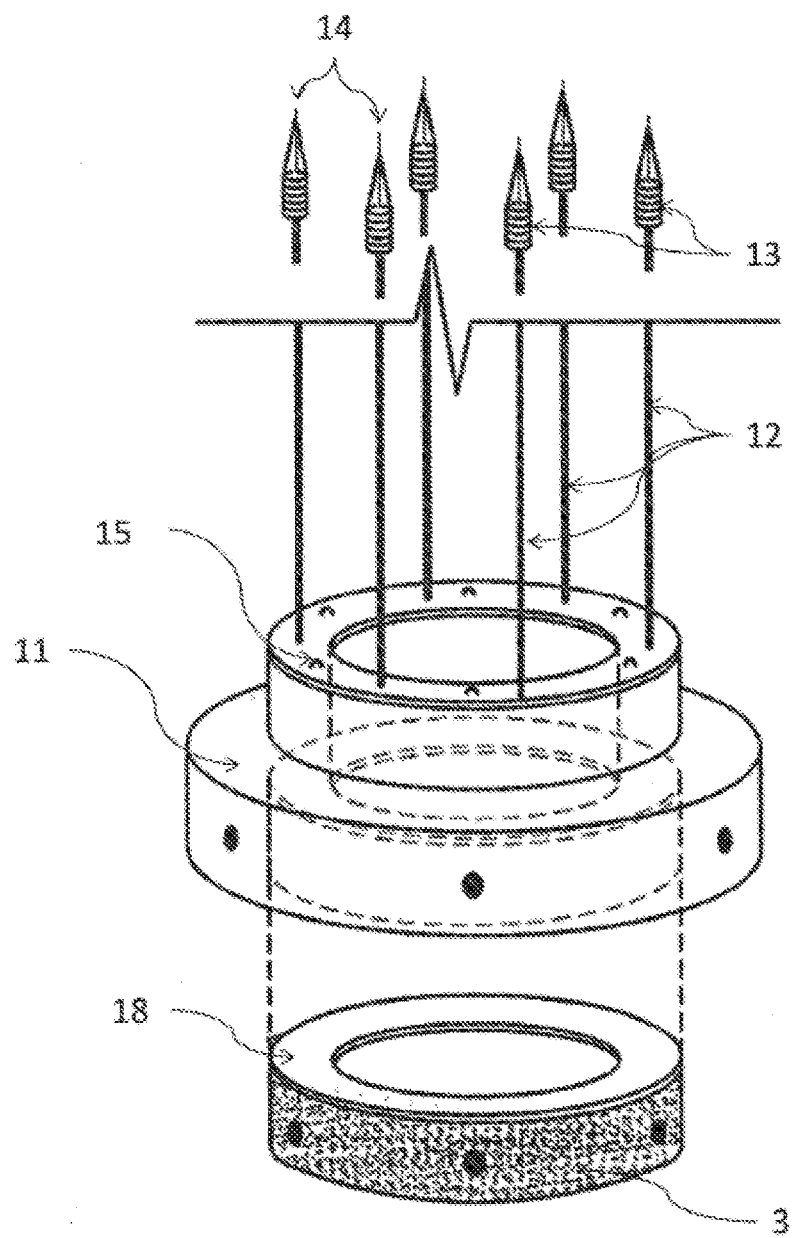
FIG. 18 is a side perspective view of the placement of the first element of the NEW INTAKE, showing the principle components.
Figure 19:
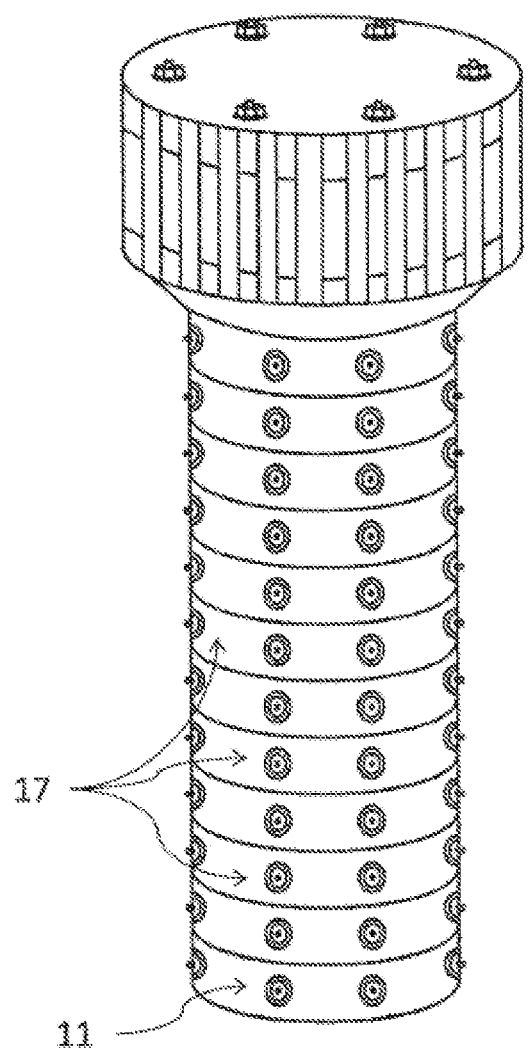
FIG. 19 is a side perspective view of the new repaired intake.

The plan drawing shown in (FIG. 7) outlines the following characteristics: before installing the first modular ring, a 1-mm thick Poliflex polyethylene cover is mounted to isolate the work area from sub-seepage, and for better results it is stapled to the perimeter of the old INTAKE (3), this polyethylene extends to the outer of the COUNTERWEIGHT LOAD CIRCULAR BRACE (7), and the drawing also depicts the first modular ring of the CABIN FOR CONTROLLING SEDIMENT (1) with its 4 mobile closed-circuit cameras (21), 6 lighting poles (6) with lamps, elevators-forklifts (22) and 4 emergency seascape stairs (23).

To ensure the stability of the CABIN FOR CONTROLLING SEDIMENT (1), a plurality of TENSOR COUNTERWEIGHT LOAD PLATFORM (19) will be installed, each platform of 4.00×4.00 m and made of 6"×6" PTR, one platform shall be mounted for each steel cable or tension belt (20), with the number of jumbo sacks in accordance with the requirements of each project. 4 PLATFORMS (19) shall be mounted to be tightened at 45° and at a height of 15 m. and 6 PLATFORMS (19) to be tightened at 45° and at a height of 30 m. The most appropriate method for filling the sacks shall be used, which can include: filling them outside and transferring them by means of cranes or filling them at the required site through a hopper, continuous belt, pump and hose to the sack, etc.

Figure 2:
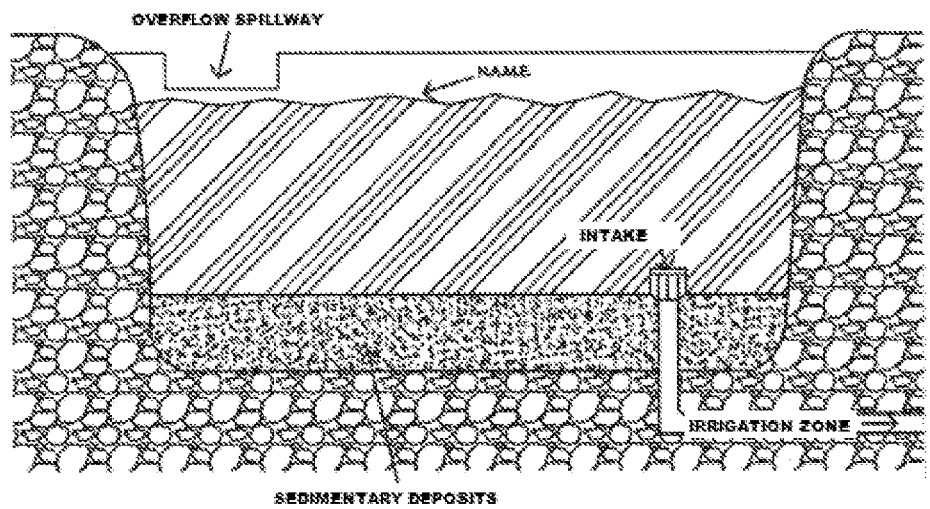
FIG. 2 shows a cross-sectional view of how a storage dam is seen after 50 to 60 years, which shows how the sedimentary deposits over time nearly block the intake.
Figure 3:
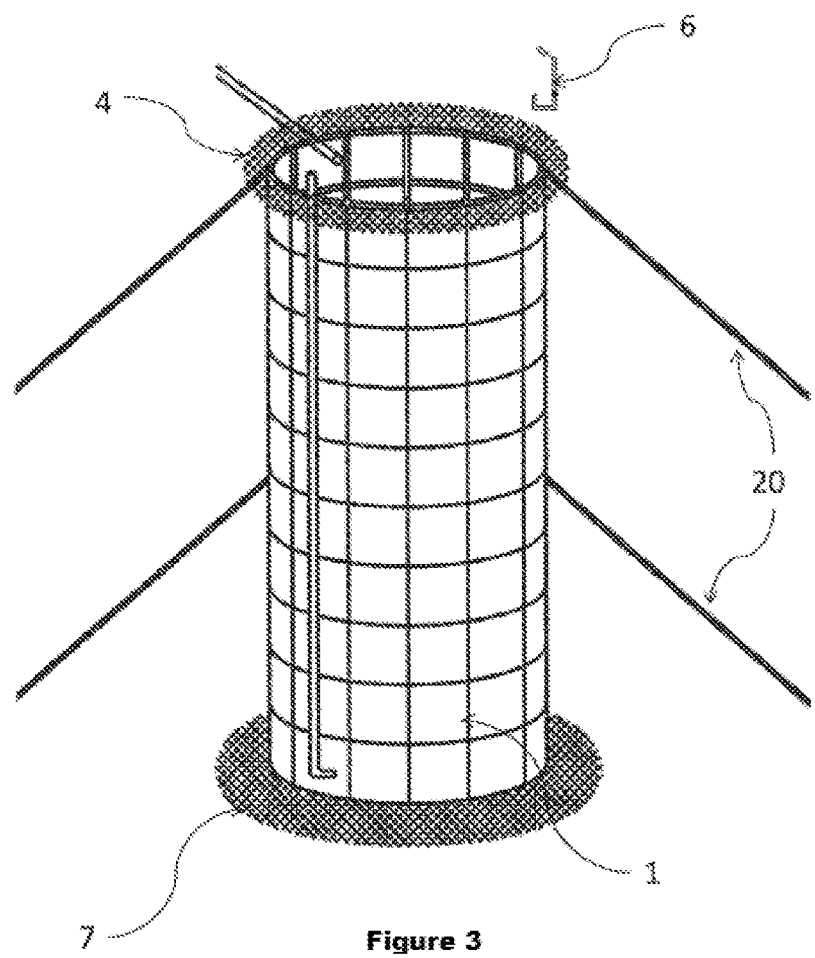
FIG. 3 is a perspective view of the CABIN FOR CONTROLLING SEDIMENT, which shows the sediment drainage pipes, the filling pipes, the tension cables, the service aisle, and in the lower part, the counterweight load platform is also shown.

Based on the particular characteristics of each project, such as its geographic location, main channel slope, and the REPAIR OF AN INTAKE FOR A STORAGE DAM, a use life of the existing infrastructure can be extended for 50 years or more. (FIG. 2). The following components are for carrying out these works are highlighted: barge and cranes (2), CABIN FOR CONTROLLING SEDIMENT (1), by employing divers and pneumatic equipment, the demolishment of INTAKE (3) shall take place, taking special cares when cutting in such a way that the cover can be removed in a single piece, and a SAFETY FRAME (8) was especially designed to facilitate the removal of the demolished cover that encases the cover with two 6" gauge 40 PTR metal structures, both frames are attached by screws and 4 hook holders, and a crane is used to begin the lifting and removal of the cover. (FIG. 12).

For the purposes of demolishing the grids portion of the INTAKE, considering the fact that the works are carried out underwater, a FRAME GUIDE (9) was designed that is fixed at the lower part of the INTAKE (3), making sure that this frame is fixed exactly in the horizontal position; since the remaining lower section shall serve as the base of the NEW INTAKE and this horizontal positioning shall result in that the new over-lifting of the shall be perfectly vertical, which enhances its stability. In order to obtain the exact measurement of the remaining lower body of the old INTAKE, the CALLIPER FRAME (10) has been designed, which is used for this measurement, adhering to the shape of the current INTAKE which can be hexagonal, octagonal, rectangular or circular. This CALLIPER FRAME (10), as its name suggests, consists of a structure with a series of screws with cranks (16) that, when adjusting to the concrete structure, provides the exact measurements and. This is very important because it serves as a basis for the construction of the metal formworks of the new INTAKE, when mounting the first element (11) of the NEW INTAKE, which consists of the following characteristics:

- It has 6 horizontal openings for 2"-diameter-by-60-cm-length stainless steel screws, which serve to attach this first element (11) to the base of the old INTAKE.
- A 2" thick neoprene ring (18) is placed to the remaining base of the old INTAKE.
- The first element (11) has 6 vertical stainless steel bars (12), 2" in diameter and 10 m high, or whichever is required for the specific requirements of each particular project, furthermore, each vertical bar (12) has a 1" diameter threading tapering at the top portion, wherein a 60-cm long cone extension (13) is screwed in, with a ½" diameter longitudinal opening through which a steel cable (14) is inserted, the cable serving as a guide for the assembly of the following elements.
- It has a plurality of 1" steel anchors (15) for placing the cargo hooks.
- A scaffold, metal formwork, and an upper support fixture (not shown) to keep the stainless steel bars perfectly in place and in the vertical position shall be built for the process of construction of the first element (11); during the cast and setting of the cement of the first element (11).

The high-resistance concrete of all the components is steam-cured to speed up and optimize the setting process.

The second to the last elements (17) are made with the same mold as the first element (11), but instead of using vertical bars, it has guide openings made of 3"-diameter PVC tubes, when mounting the last element as required by the height of the INTAKE of each project, the cone extensions are removed (13) and the steel cable (14), which served as a guide for the assembly of the elements, is cut, and the 6 stainless steel circular plates, 20 cm in diameter and ½" thick, are mounted to the top portion, and the corresponding nuts are placed which anchors each component perfectly in the vertical and horizontal positions; all the elements comprise a single structure in the NEW INTAKE.

The steps to follow for applying the method for repairing an intake for a storage dams is generally described below:

a) Assembling and transferring the modules to form the CABIN FOR CONTROLLING SEDIMENT (1) to the intake site.

b) Preparing the perimeter path to the INTAKE in order to proceed with the demolition of the cover.

c) Mounting the GUIDE FRAME (9) for horizontally cutting the rest of the INTAKE.

d) Using the CALLIPER FRAME (10) to take exact measurements and shape of the outer perimeter of the old base in order to use it as a mold.

e) Once the measurements are taken by the CALLIPER FRAME (10), the metal formwork of the first element (11) is manufactured.

f) Using the same formwork, the remaining elements are constructed, whereby PVS tubes are used instead of metal bars to construct the guide openings.

g) Once the elements are settled, they are transferred to their final site by the barge and cranes (2).

h) The first element (11) is placed at the old intake to serve as a guide for the following elements (17) using the metal bars (12) and the guide openings.

i) Once the last element is installed (17), the cone extensions (13) are removed and the steel cable (14), which served as a guide, is cut in order to place the 20-cm circular plates along with the corresponding nuts.

j) Finally, the CABIN (1) is disassembled, the cranes (2) removed and the barge is dismantled.

The invention claimed is:

1. A method for repairing a first intake including a cover, a grid, and a lower part for a storage dam, the method comprising:

assembling and transferring modules to form a cabin for controlling sediment to the first intake;

preparing a perimeter path to the first intake to facilitate demolition of the cover;

mounting a guide frame at the first intake to facilitate horizontally cutting the first intake to leave a remaining lower section of the first intake, the remaining lower section has an outer perimeter;

taking, using a caliper frame, exact measurements of the remaining lower section of a base of the first intake to use the caliper frame as a mold to construct a metal formwork for concrete elements of a second intake using the measurements obtained by the caliper frame;

constructing, using the metal formwork, a first concrete element of second first intake, the first concrete element includes vertical metal bars, each of the vertical metal bars has an upper part with a cone extension defining an opening through which a steel cable is inserted;

constructing, using the metal formwork, remaining concrete elements from the second intake are constructed, the remaining concrete elements include guide openings instead of the vertical metal bars of the first concrete element to construct the guide openings;

transferring, once formwork construction of the concrete elements is complete, the concrete elements to a permanent site via a barge and cranes;

placing the first concrete element at the remaining lower section of the first intake to serve as a guide for the remaining concrete elements using the metal bars and the guide openings;

installing each of the remaining concrete elements such that the guide openings are guided in the metal bars;

removing the cone extensions once a last of the concrete elements is installed;

cutting the steel cable that served as a guide to place 20-cm circular plates along with corresponding nuts;

disassembling the cabin and removing the cranes without draining a work area.

2. The method of to claim 1, wherein construction of each of the remaining concrete elements includes placing PVC pipes to form the guide openings.

3. The method of claim 2, wherein the cabin has at least one of lighting, mobile closed-circuit video cameras, emergency seascape stairs, an elevator and forklifts.

4. The method of claim 3, wherein:
the cabin has an upper part with a perimeter aisle and lighting posts;
the cabin has a lower part with a brace that serves to place jumbo sacks with gravel or counterweight;
the cabin allows for demolition of the first intake and assembly of the second intake without draining the work area; and
an upper and lower template mold is used to assemble each of the modules in the cabin, the upper template mold is subsequently removed from each of the modules under construction and a template is placed at the base of the plate so that each of the modules is not warped upon being lifted for transport to an intake site.

5. The method of claim 1, wherein:
the upper part of each of the vertical metal bars has a reduced thread in the upper part, and
once the last of the concrete elements is installed, the cone extensions are removed, the steel cable that served as the guide for mounting the plates is cut, and corresponding screws are thread in the reduced thread with which each of the concrete elements is anchored in vertical and horizontal positions such that each of the concrete elements includes a single structure in the second intake.

6. The method of claim 1, wherein:
the cabin is assembled such that water in an interior of the cabin remains isolated from a rest of a reservoir and ceases to form part of currents thereof to accelerate a sedimentation process that diminishes a turbidity characteristic of the reservoir,
two pipes are installed, one of the pipes is installed in the lower part of the cabin for pump-extraction of sediments, and another of the pipes is installed to fill the cabin with makeup water to prevent the cabin from collapsing and to help clarify the water, and
a mini-sprinkler irrigation system with a half-circle sprinkler is installed, to add a clarifier concentration to the water in the interior of the cabin.

7. The method of claim 6, wherein the water added to the interior of the cabin includes a 1% clarifier, wherein clarifier concentrate is added in a proportion without exceeding a rate of 1 liter of concentrate for each 100 cubic meters of water inside the cabin.

8. The method of claim 1, wherein before installing a first module, the cover is placed to isolate sub-seepage in the work area, the cover being stapled around the first intake and extending to an outside of a counterweight load circular brace.

9. The method of claim 1, wherein in order to stabilize the cabin, a plurality of tensor counterweight loading platforms is installed by mounting a platform for each of the steel cable or tension belts.

10. The method of claim 9, wherein the cover is a 1-mm-thick Poliflex polyethylene cover.

11. The method of claim 1, wherein using divers and pneumatic equipment, the cover of the first intake is demolished such that the cover is able to be removed in one piece using a safety frame that encases the cover, and wherein the crane begins to lift and remove the cover with hook holders.

12. The method of claim 11, wherein the safety frame encases the cover with two metal PTR structures attached by screws.

13. The method of claim 1, wherein a guide frame for the demolition of the first intake is affixed to a lower part of the first intake in the horizontal position as a result of the remaining lower section of the lower part of the first intake serving as the base for the second intake, the measurement of the remaining lower part of the first intake being obtained by the caliper frame that includes a structure with a series of screws with cranks that, when adjusted to the concrete structure of the remaining section of the lower part of the first intake, serves as the base for the construction of metal formworks for building the concrete elements to form the second intake.

14. The method of claim 1, wherein the first concrete element has horizontal openings for screws which serve to attach the this first concrete element to the remaining lower section of the first intake, a ring is mounted to the remaining lower section, the first concrete element further includes vertical bars, each of the concrete elements has a plurality of steel anchors for attaching cargo hooks, and each of the remaining concrete elements has guide openings.

15. The method of claim 1, wherein the cabin includes of a modular system of circular structures that are stacked to exceed a water depth of a reservoir, all of the modules are assembled outside and subsequently lifted, deposited, and stacked over the first intake via of the barge and one or more of the cranes.

16. The method of claim 15, wherein:
the cabin has an upper part with a perimeter aisle and lighting posts;
the cabin has a lower part with a brace that serves to place jumbo sacks with gravel or counterweight;
the cabin allows for demolition of the first intake and assembly of the second intake without draining the work area; and
an upper and lower template mold is used to assemble each of the modules in the cabin, the upper template mold is subsequently removed from each of the modules under construction and a template is placed at the base of the plate so that each of the modules is not warped upon being lifted for transport to an intake site.

* * * * *